June 13, 1972    W. A. GRAFF ET AL    3,669,698
SEAL GLASSES
Filed Dec. 29, 1969
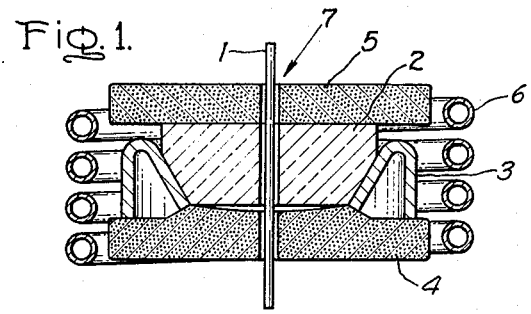
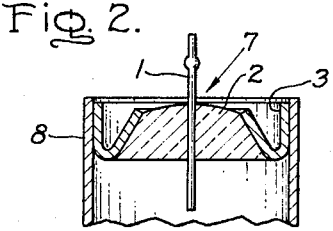
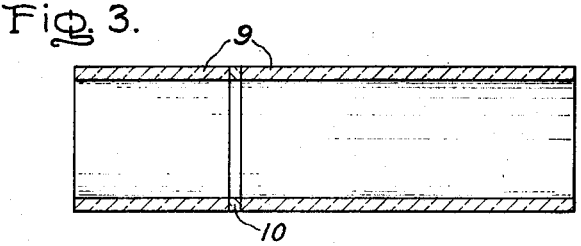
Inventors:
William A. Graff
Jaroslaw Kohut
by Richard H. Burgess
Their Attorney United States Patent Office 3,669,698
Patented June 13, 1972

3,669,698
SEAL GLASSES
William A. Graf, Willoughby, and Jaroslaw Kohut, Parma Heights, Ohio, assignors to General Electric Company
Filed Dec. 29, 1969, Ser. No. 888,371
Int. Cl. C03c 3/04, 3/08, 5/00
U.S. Cl. 106—54    5 Claims

ABSTRACT OF THE DISCLOSURE

Seal glass compositions directly sealable to tantalum and suitable for use as parts of hermetically sealed tantalum electrolytic capacitors, including an effective amount of chromic oxide.

CROSS-REFERENCES TO RELATED APPLICATIONS

Particular applications of the seal glasses and seals of the present invention are described and claimed in concurrently filed application Ser. No. 889,004 which issued as Pat. No. 3,624,460 on Nov. 30, 1971, filed in the name of E. M. Correll, entitled "Hermetic Glass-to-Metal Seal and Device Employing Same" and assigned to the assignee of the present application.

BACKGROUND OF THE INVENTION

Tantalum electrolytic capacitors of the sintered pellet anode type, usually designated as a "slug" type of tantalum electrolytic capacitor, generally contain sulfuric acid as the electrolyte. Of necessity the containers of such capacitors are of suitable acid resistant materials and are hermetically sealed to prevent loss of the electrolyte and entrance of contaminants.

The use of such capacitors in environments wherein extremes of temperature and pressure are encountered, such as in outer space equipment, for example, requires hermetic seal structures resistant not only to chemical attack by the electrolyte but also to the temperature and pressure variations encountered in such use.

While glass-to-metal hermetic seals are used extensively in various types of electrical devices, the use of such economically desirable, compact seals in tantalum electrolytic capacitors of the sintered tantalum pellet type has not been successful heretofore because early failure of the seal terminated prematurely the useful operating life of the capacitor. The cause of the difficulty with the glass-to-metal seals heretofore available was the formation, at the interface between the glass and the tantalum parts of the seal during manufacture of the seal body, of reaction products susceptible to attack by the acid electrolyte of the capacitor. Such attack resulted in leakage at the seal and early failure of the capacitor.

SUMMARY OF THE INVENTION

The principal object of the invention is to provide improved seal glass compositions and glass-to-metal and glass-to-ceramic seal bodies including such glasses useful in the arts generally.

Another object of the invention is to provide an effective hermetic glass-to-metal seal body for tantalum electrolytic capacitors of the sinterd tantalum pellet type including an acid electrolyte.

Further objects and advantages of the invention will appear from the following detailed description thereof.

The present invention is based on the discovery that a seal body inculding a tantalum part having directly fusion-sealed thereto a boroaluminosilicate glass including alkali and alkaline earth oxides and at least a small but effective amount of chromic oxide has at the interface between the glass and tantalum no reaction products susceptible to attack by an acid electrolyte and is effective for hermetically sealing the container of a sintered pellet type of tantalum capacitor for a long, useful operating life of the capacitor. This may facilitate the making of tantalum glass seals for capacitors wherein the tantalum can be suitably electrolytically oxidized without interference from pyrolytically-formed tantalum oxide.

Glasses for the present invention have compositions in the following ranges in percent by weight, except for incidental impurities and residual fluxes and coloring and refining agents, of about:

| | |
|---|---|
| $SiO_2$ | 63–65 |
| $Al_2O_3$ | 2–3 |
| $Na_2O$ | 2–3 |
| $K_2O$ | 6–8 |
| $CaO$ | 0–2 |
| $BaO$ | 4–6 |
| $Cr_2O_3$ | 0.2–1.0 |
| $B_2O_3$ | 15–17 |

Furthermore, glasses of the invention preferably have coefficients of thermal expansion in the range of 50 to $57 \times 10^{-7}$ cm./cm./° C. in the range of 0 to 300° C.

BRIEF DESCRIPTION OF THE DRAWING

In the drawing accompanying and forming part of this specification.

FIG. 1 is a sectional view of parts assembled in a fixture for the making of a glass-to-metal seal of the present invention;

FIG. 2 is a sectional view of a completed glass-to-metal seal of the present invention hermetically sealing an opening in the metal container of a tantalum capacitor; and FIG. 3 is a sectional view of two ceramic tubes sealed together by a glass of the present invention.

DESCRIPTION OF THE PREFERRED EMBODIMENTS

As a preferred embodiment of the present invention, seal glass containing chromic oxide is produced from a batch having the composition in parts by weight of:

| | |
|---|---|
| Silica sand | 3153 |
| Aluminum oxide | 151 |
| Sodium carbonate | 172 |
| Potassium carbonate | 593 |
| Boric oxide | 863 |
| Barium carbonate | 257 |
| Calcium carbonate | 180 |
| Chromic oxide | 50 |

When these proportions are measured in grams, this batch after mixing can be melted in a platinum-rhodium crucible in an air atmosphere electric furnace at a temperature between 1482° C. and 1510° C. to produce about 5000 grams of glass. The theoretical composition of the glass, as calculated from the batch in weight percent, is 63% $SiO_2$, 3% $Al_2O_3$, 2% $Na_2O$, 8% $K_2O$, 17% $B_2O_3$, 4% $BaO$, 2% $CaO$, and 1% $Cr_2O_3$.

The glass has the following approximate physical properties:

| | |
|---|---|
| Softening point | 776° C.±15° C. |
| Annealing point | 585° C±15° C. |
| Strain point | 548° C±15° C. |
| Coefficient of expansion (0–300° C.) | $56.3 \times 10^{-7} \pm 2.0 \times 10^{-7}$ |
| Sealing temperature | Below 1000° C. |
| Color | Dark green. |

The glass forms a satisfactory hermetic fused seal with tantalum which has an expansion coefficient of about $66 \times 10^{-7}$ cm./cm./° C. The coefficient of expansion of the glass should be somewhat lower than that of tantalum.

To form a glass-to-metal seal useful in a tantalum capacitor, for example, the glass may be crushed to a powder, mixed with a binder, pressed to form an annular pellet, then heated first to competely volatilize the binder and then further heated to sinter the glass particles of the pellet together.

Hermetic seals including tantalum capacitor parts and the glass of the present invention fusion-bonded to such parts may be made in the manner shown in FIG. 1 of the drawing, that is, by positioning a tantalum current leading-in wire 1, an annular glass preform 2 and with the tantalum wire extending through the center of the preform and the preform supported concentrically in the tantalum header. The glass is covered by a graphite cap 5. The header, and to a certain extent, the graphite pedestal and cap are heated by a high frequency electronically powered induction coil 6 in an atmosphere of flowing argon to a temperature of about 100° C. for about 45 seconds. The glass-to-metal seal assembly 7 then is cooled to room temperature in a continuing flow of argon gas. The tantalum header 3 is then circumferentially welded to the metal container 8 of the capacitor to hermetically seal the latter.

Glasses of the invention make good glass-to-metal hermetic seals of a matched or slight compression type with metals which have mean coefficients of thermal expansion in the temperature range of 0° C. to 300° C. no greater than that of tantalum and not more than about $15 \times 10^{-7}$ cm./cm./° C. below that of tantalum over the same temperature range which is about $66 \times 10^{-7}$ cm./cm./° C. Titanium and a 46% nickel balance iron alloy are examples of metals of this type.

Various examples of glasses of the invention found to make suitable seals to tantalum are listed in Table I below along with their coefficients of expansion measured as described above. The CoO in glass 2 is a coloring agent, and various other coloring agents known in the art can be used without significantly affecting the physical properties of the glass. The same applies to incidental impurities and residual fluxes and refining agents.

TABLE I

| Oxide | 1 | 2 | 3 | 4 |
|---|---|---|---|---|
| $SiO_2$ | 63.0 | 62.6 | 64.0 | 65.0 |
| $Al_2O_3$ | 3.0 | 3.0 | 3.0 | 3.0 |
| $Na_2O$ | 2.0 | 2.0 | 2.0 | 2.0 |
| $K_2O$ | 8.0 | 8.0 | 7.0 | 6.0 |
| CaO | 2.0 | 2.0 | 2.0 | 2.0 |
| BaO | 4.0 | 4.0 | 4.0 | 4.0 |
| $Cr_2O_3$ | 1.0 | 1.0 | 1.0 | 1.0 |
| $B_2O_3$ | 17.0 | 16.9 | 17.0 | 17.0 |
| CoO | | 0.5 | | |
| Exp.$\times 10^{-7}$ | 56.8 | 58.7 | 55.1 | 51.7 |

The seal embodying the present invention can be used for many types of electrical devices, such as foil-type capacitors, as well as for devices which are not electrical in character.

As pointed out in the book "Glass-to-Metal Seals" by J. H. Partridge, published in 1949 by the Society of Glass Technology, Sheffield, England, most ceramic substances possess nearly uniform thermal expansion characteristics from room temperature up to temperatures exceeding the upper annealing temperatures of glasses. For this reason, the principles applied to matched glass-to-metal seals can often be applied to making of glass-to-ceramic seals. Thus, it is necessary to substantially match the thermal expansion coefficient of the glass with that of the ceramic over the temperature range involved.

Glasses of the present invention are useful for sealing together two tubes of polycrystalline sintered alumina as shown in FIG. 3. The alumina is suitably of the type disclosed and claimed in Pat. 3,026,210—Coble, dated Mar. 20, 1962, and assigned to the same assignee as the present application. The alumina tubes are shown at 9, and the glass of the present invention at 10.

Glass-to-ceramic seals can be made by heating the assembled tubes 9 with the glass 10 between the adjacent ends of the tubes in an atmosphere such as air or a neutral glass or a vacuum to the sealing temperature of the glass.

The particular features and principles outlining the invention described in connection with the specific examples will suggest to those skiled in the art various equivalent modifications thereof, especially in the art of making a glass-to-metal or glass-to-ceramic seal and in formulating glass compositions with minor changes in percentages.

What we claim as new and desire to secure by Letters Patent of the United States is:

1. An acid-resistant glass of hermetically sealing to tantalum and to other metals, alloys and ceramics having thermal expansion characteristics such that the mean coefficients of thermal expansion over the temperature range of 0° C. to 300° C. is no greater than that of tantalum and not more than about $15 \times 10^{-7}$ cm./cm./° C. below that of tantalum, and which has a composition in percentages by weight as calculated from the batch, except for incidental impurities and residual fluxes and coloring and refining agents, consisting of about:

| | |
|---|---|
| $SiO_2$ | 63–65 |
| $Al_2O_3$ | 2–3 |
| $Na_2O$ | 2–3 |
| $K_2O$ | 6–8 |
| CaO | 0–2 |
| BaO | 4–6 |
| $Cr_2O_3$ | 0.2–1.0 |
| $B_2O_3$ | 15–17 |

2. A glass according to claim 1 having approximately the following composition in percent by weight:

| | |
|---|---|
| $SiO_2$ | 63.0 |
| $Al_2O_3$ | 3.0 |
| $Na_2O$ | 2.0 |
| $K_2O$ | 8.0 |
| CaO | 2.0 |
| BaO | 4.0 |
| $Cr_2O_3$ | 1.0 |
| $B_2O_3$ | 17.0 |

3. A glass according to claim 1 having approximately the following composition in percent by weight:

| | |
|---|---|
| $SiO_2$ | 64.0 |
| $Al_2O_3$ | 3.0 |
| $Na_2O$ | 2.0 |
| $K_2O$ | 7.0 |
| CaO | 2.0 |
| BaO | 4.0 |
| $Cr_2O_3$ | 1.0 |
| $B_2O_3$ | 17.0 |

4. A glass according to claim 1 having approximately the following composition in percent by weight:

| | |
|---|---|
| $SiO_2$ | 62.6 |
| $Al_2O_3$ | 3.0 |
| $Na_2O$ | 2.0 |
| $K_2O$ | 8.0 |
| CaO | 2.0 |
| BaO | 4.0 |
| $Cr_2O_3$ | 1.0 |
| $B_2O_3$ | 16.9 |
| CoO | 0.5 |

5. A glass according to claim 1 having approximately the following composition in percent by weight:

| | |
|---|---|
| $SiO_2$ | 65.0 |
| $Al_2O_3$ | 3.0 |
| $Na_2O$ | 2.0 |
| $K_2O$ | 6.0 |
| CaO | 2.0 |
| BaO | 4.0 |
| $Cr_2O_3$ | 1.0 |
| $B_2O_3$ | 17.0 |

(References on following page)

References Cited

UNITED STATES PATENTS

| | | | |
|---|---|---|---|
| 2,844,693 | 7/1958 | Rigterink | 106—48 |
| 2,846,325 | 8/1958 | Bennett et al. | 106—54 |
| 2,937,100 | 5/1960 | Oldfield et al. | 106—54 |

FOREIGN PATENTS

| | | | |
|---|---|---|---|
| 215,222 | 5/1958 | Australia | 106—54 |

TOBIAS E. LEVOW, Primary Examiner

M. L. BELL, Assistant Examiner

U.S. Cl. X.R.

106—48